(12) United States Patent
Colson

(10) Patent No.: US 10,960,987 B1
(45) Date of Patent: Mar. 30, 2021

(54) SYSTEM OF CAMERAS ONBOARD AN AIRCRAFT

(71) Applicant: Miller Colson, McDonough, GA (US)

(72) Inventor: Miller Colson, McDonough, GA (US)

( * ) Notice: Subject to any disclaimer, the term of this patent is extended or adjusted under 35 U.S.C. 154(b) by 0 days.

(21) Appl. No.: 16/693,573

(22) Filed: Nov. 25, 2019

(51) Int. Cl.
*B64D 47/08* (2006.01)
*H04N 5/225* (2006.01)

(52) U.S. Cl.
CPC ............. *B64D 47/08* (2013.01); *H04N 5/225* (2013.01)

(58) Field of Classification Search
None
See application file for complete search history.

(56) References Cited

U.S. PATENT DOCUMENTS

| | | | |
|---|---|---|---|
| 6,405,975 B1 * | 6/2002 | Sankrithi | B64D 47/08 244/1 R |
| 7,027,719 B1 * | 4/2006 | Schneider | G07C 5/0891 348/143 |
| 7,131,136 B2 * | 10/2006 | Monroe | G08B 13/1966 725/105 |
| 2002/0093564 A1 | 7/2002 | Israel | |
| 2009/0201413 A1 * | 8/2009 | Fishman | H04N 7/181 348/373 |

* cited by examiner

*Primary Examiner* — Edemio Navas, Jr.
(74) *Attorney, Agent, or Firm* — Sanchelima & Associates, P.A.; Christian Sanchelima; Alexander J. Rodriguez

(57) ABSTRACT

A system of cameras onboard an aircraft including a camera assembly and a video data management assembly is disclosed herein. The camera assembly is modified to aid the pilots of an aircraft by providing a continuous visual stream of different sections of the aircraft. The visual aid provided to the pilots from the camera assembly will aid the pilots in identifying problems and solutions in the event of an emergency. The system for cameras onboard an aircraft further includes a video data management computer is modified to record and store the date being streamed from the cameras located on the aircraft to a computer. Additionally, the video selector unit is adapted to allow the pilots to switch between different views of the cameras. Furthermore, the video data management computer will stream the video feed of the cockpit camera to maintenance control of the aircraft in the event of an emergency.

11 Claims, 4 Drawing Sheets

SYSTEM OF CAMERAS ONBOARD AN AIRCRAFT

BACKGROUND OF THE INVENTION

1. Field of the Invention

The present invention relates to a system of cameras onboard an aircraft and, more particularly, to a system of cameras onboard an aircraft that allows the pilots of an aircraft to continuously view a display of the exterior and interior of an aircraft allowing the pilots access to more information to aid them in the event of an emergency.

2. Description of the Related Art

Several designs for a system of cameras onboard an aircraft have been designed in the past. None of them, however, include a system of cameras onboard an aircraft that provides the pilots of an aircraft to constant and optimal visual display of the exterior and interior of the aircraft to aid the pilot in the event of the emergency. Additionally, the interior cockpit of the aircraft is streamed to a maintenance control service of an aircraft in the event of an emergency. This will allow maintenance control to further aid the pilot during the event of an emergency. Furthermore, previous designs fail to include a system of cameras onboard an aircraft that is adapted to record and store the data gathered by the cameras on a computer thereby providing more information in the event of an emergency.

Applicant believes that a related reference corresponds to U.S. patent No. 2002/0093564 disclosing a digital camera network for a commercial aircraft. However, it differs from the present invention because the reference fails to address the issue of providing a constant display of the exterior and interior of an aircraft provided by the present invention. The present invention addresses these issues by providing a plurality of cameras of the present invention is adapted to capture the left wing, left engine, left main landing gear, left slat/flaps; right wing, right engine, right main landing gear, right slats/flaps; left stabilizer, left view of rudder; right stabilizer, right review of rudder; nose, landing gear; cockpit interior and baggage compartment. The plurality of cameras are connected to display panel located in the cockpit of a plane via a system of wires.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to teach of a system of cameras onboard an aircraft that provides a continuous stream of visuals of the exterior and interior of said aircraft to the pilots in the cockpit in order to increase the safety of the aircraft.

It is yet another object of this invention to provide a system of cameras onboard an aircraft that is adapted to record and store the data gathered by the cameras on a computer thereby providing more information in the event of an emergency.

It is still another object of the present invention to teach of a system of cameras onboard an aircraft that is adapted to provide maintenance control of said aircraft a live video stream of the pilots inside the cockpit.

It is yet another object of this invention to provide such a system of cameras onboard an aircraft that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
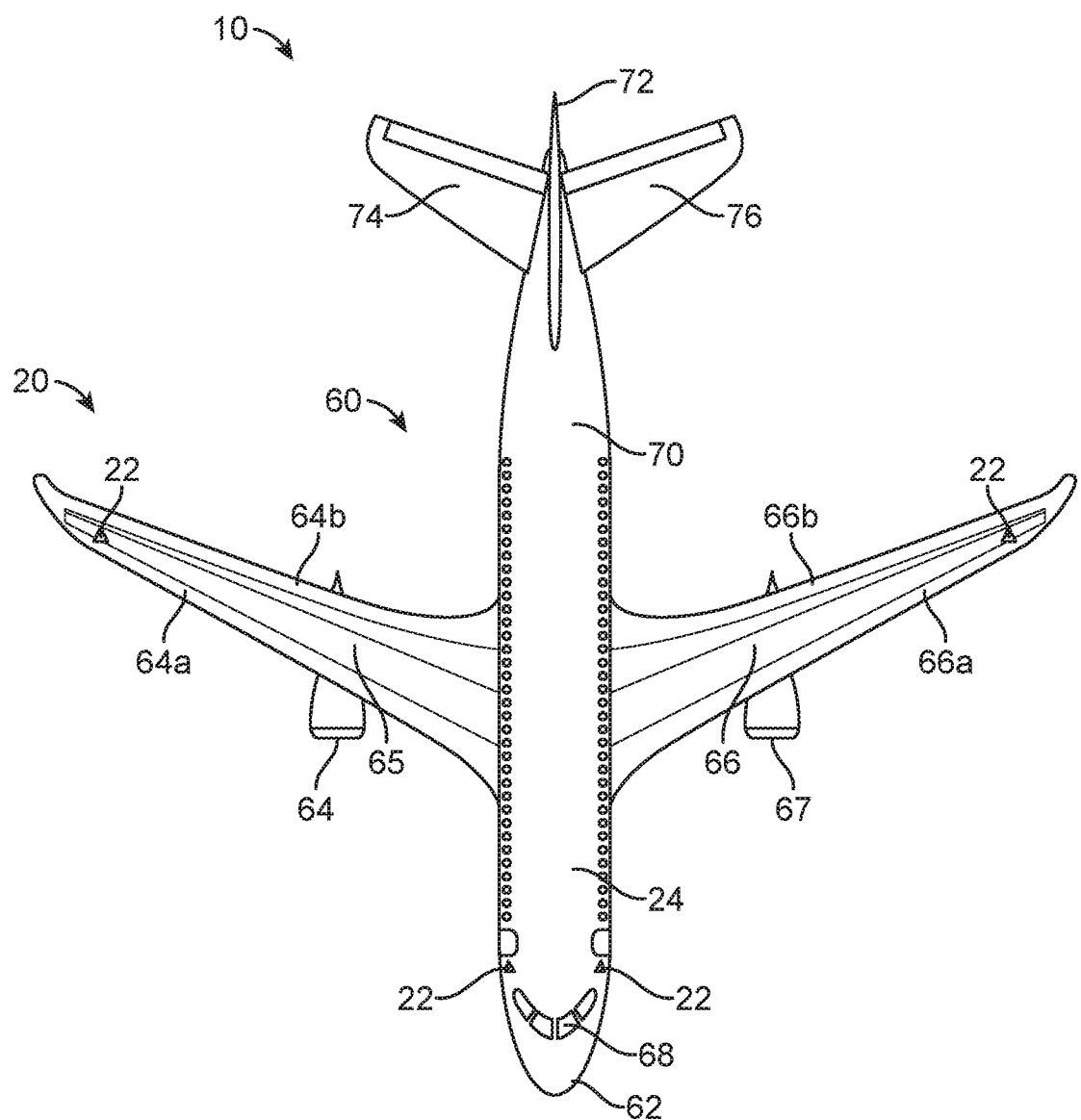
FIG. 1 represents a top view of aircraft 60 wherein a plurality of cameras 22 located at or near bulkhead station 62, a left wing 66, a right wing 64, a rudder 72, left stabilizer 76, and a right stabilizer 74 may be viewed.
Figure 2:
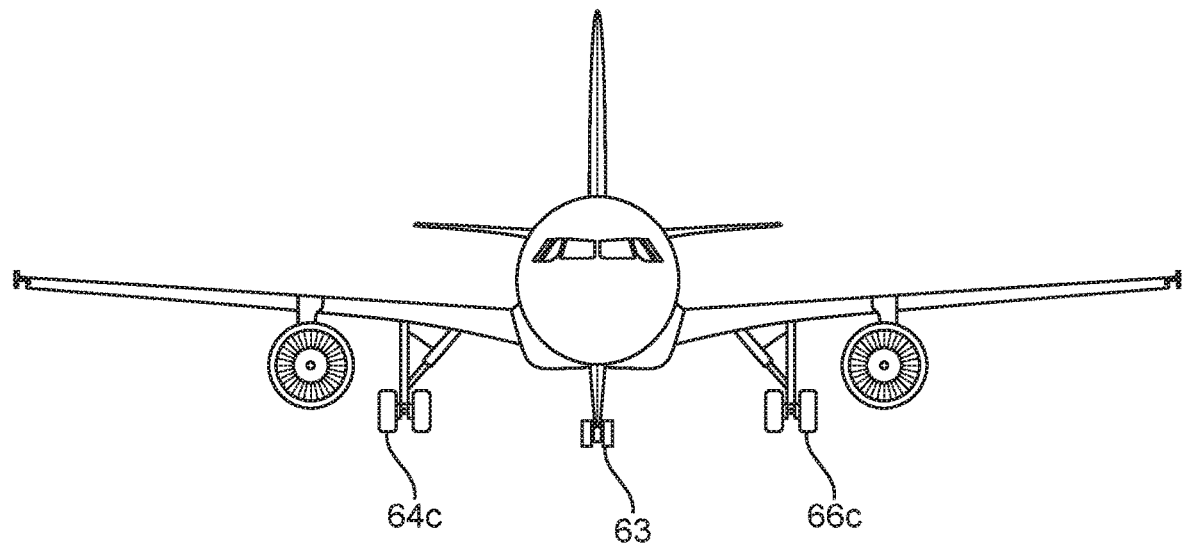
FIG. 2 shows a front view of aircraft 60 wherein a plurality of cameras 22 located at a bulkhead station 62, a left main landing gear 66C, and a right main landing gear 64C may be observed.
Figure 3:
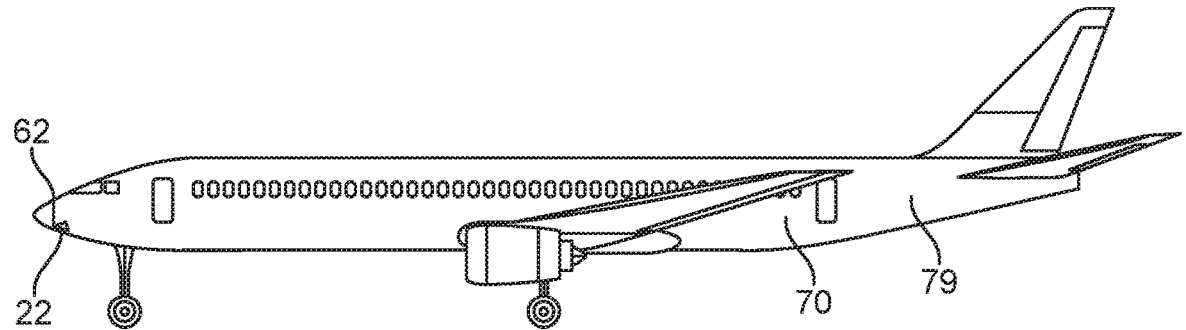
FIG. 3 illustrates a side view of aircraft 60 wherein a baggage compartment 70, and a rudder 72 may be viewed.
Figure 4:
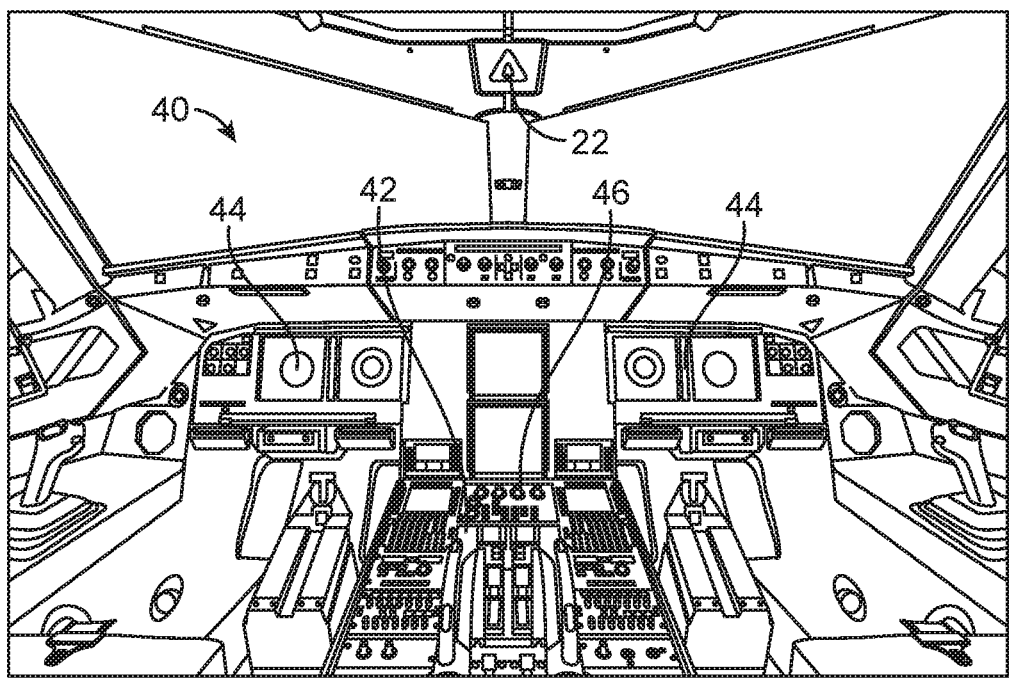
FIG. 4 is a representation of the interior of a cockpit 68 within an aircraft 60 wherein a plurality of display units 44, and a video selector unit 46 may be observed.
Figure 5:
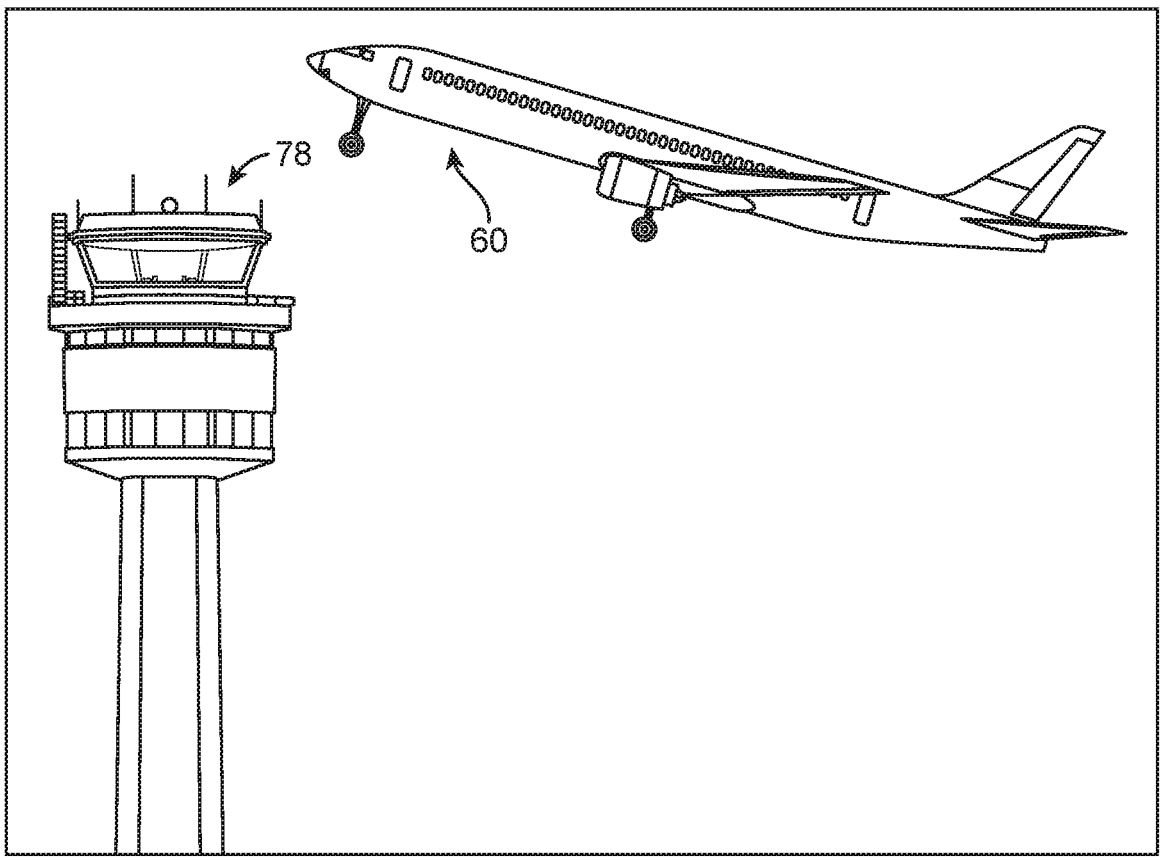
FIG. 5 represents a view of the aircraft 60 in flight within a maintenance control tower 78.

Referring now to the drawings, where the present invention is generally referred to with numeral 10, it can be observed a system of cameras onboard an aircraft 10 including a camera assembly 20 and a video data management assembly 40.

Camera assembly 20 includes a plurality of cameras 22 that are mounted on the exterior and interior of an aircraft 60. As observed in the present embodiment the plurality of cameras 22 may be placed on or near a bulkhead station 62, a left wing 66, and a right wing 64 of the exterior of aircraft 60. Additionally, the plurality of cameras 22 may be placed within a cockpit 68 and a baggage compartment 70 of the interior of the aircraft 60. The camera placed within cockpit 68 is to be used only in the event of an emergency onboard the aircraft. Although the present embodiment of the plurality of cameras 22 is observed to be located on the aforementioned locations, it should be understood that other embodiments placing the plurality of cameras 22 on different locations of the aircraft 60 may be interpreted by those skilled in the art.

Figure 6:
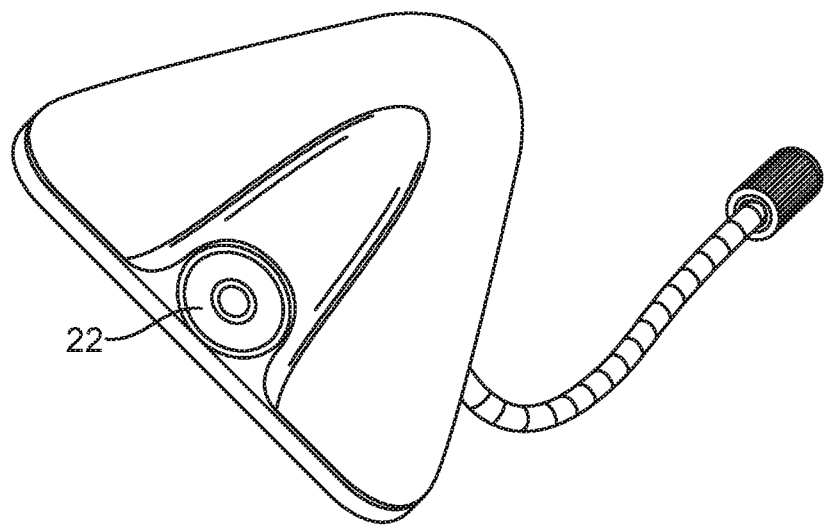
FIG. 6 shows an isometric view of a camera of the plurality of cameras 22 in accordance to an embodiment of the present invention.
Figure 7:
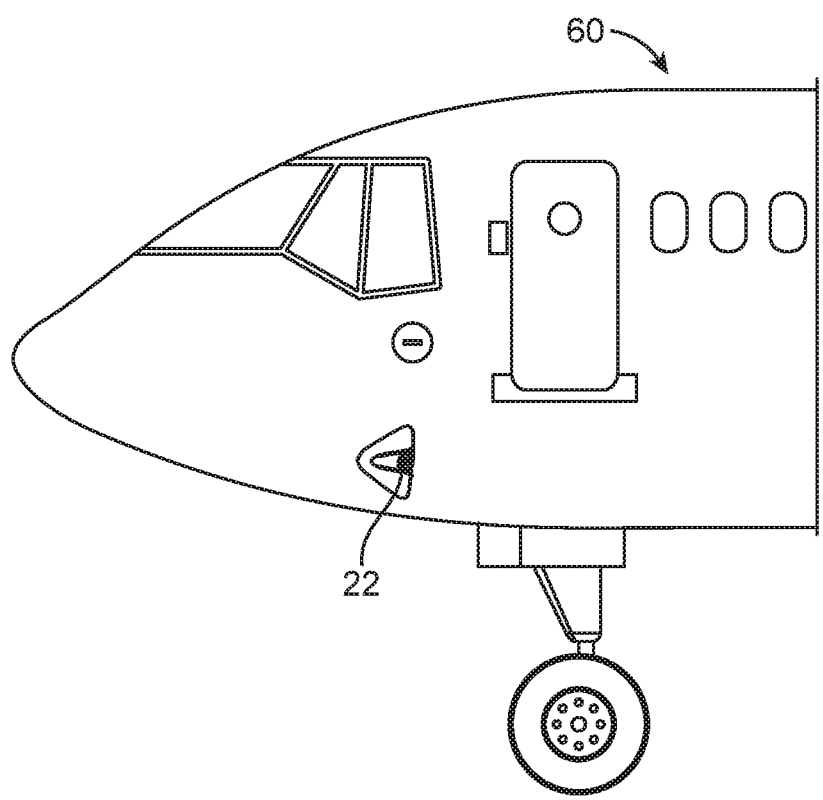
FIG. 7 illustrates a side view of a camera of the plurality of cameras 22 mounted on aircraft 60 in accordance to an embodiment of the present invention.

On the left side of aircraft 60 at or near bulkhead station 62 a camera of the plurality of cameras 22 may be placed thereon. The camera of the plurality of cameras 22 placed on the aforementioned location may be placed to capture a left wing 66, left slats 66A, left flaps 66B, a left main landing gear 66C, and a left engine 67. Furthermore, on the right side of a fuselage at or near bulkhead station 62 a camera of the plurality of cameras 22 may be placed thereon. The camera of the plurality of cameras 22 placed on the aforementioned location may be placed to capture a right wing 64, right slats 64A, right flaps 64B, a right main landing gear 64C, and a right engine 65. To continue, beneath or near bulkhead station 62 a camera of the plurality of cameras 22 may be placed inside the nose wheel weld area. The camera of the plurality of cameras 22 placed on the aforementioned location may be placed to capture a nose landing gear 63. Additionally, other embodiments of the plurality of cameras 22 placed at or near bulkhead station 62 capturing other sections of the exterior of aircraft 60 may be interpreted. FIG. 6 depicts an embodiment of one of plurality of cameras 22. It can be observed that the camera includes a housing which has a triangular shape with rounded edges. Further, the housing includes a top portion which protrudes outwardly from a top end of the housing. The top portion houses a camera lens and begins along a lateral edge of the housing. The top portion then partially extends towards an inner area of the top of the housing. It should be understood that the camera lens is in constant exposure from the top portion in order to constantly provide a pilot with a view of the outside of the aircraft during flight.

A camera of the plurality of cameras 22 may also be placed on the top of left wing 66 tip at or near the navigation lights assembly of left wing 66 of aircraft 60. The camera of the plurality of cameras 22 placed on the aforementioned location may be placed to capture the left side of a rudder 72, a left stabilizer 76 and the left side of an AFT. fuselage 79. Furthermore, a camera of the plurality of cameras 22 may also be placed on the top of right wing 64 tip at or near the navigation lights assembly of right wing 64 of aircraft 60 on the distal end of right wing 64 of aircraft 60. The camera of the plurality of cameras 22 may be placed to capture the right side of the rudder 72 a right stabilizer 74, and the right side of an AFT. fuselage 79. Additionally, other embodiments of the plurality of cameras 22 placed on the left wing 66 and the top of right wing 64 tip at or near the navigation light assembly capturing other sections of the exterior of aircraft 60 may be interpreted.

A camera of the plurality of cameras 22 may also be placed within the cockpit 68 of the interior of aircraft 60. The camera of the plurality of cameras 22 placed within the cockpit 68 may capture the pilots of aircraft 60 as well as the interior of the cockpit. This camera will only be activated when aircraft 60 experiences a true emergency. Additionally, a camera of the plurality of the cameras 22 may be placed within the baggage compartment 70 of the aircraft 60 to capture the interior of the baggage compartment.

Camera assembly 20 also comprises wires 24 located within the interior of aircraft 60. Wires 24 are used to communicably attach a plurality of cameras 22 to the video data management assembly 40.

Video data management assembly 40 includes a video data management computer 42, a plurality of display units 44, and a video selector unit 46. Video data management computer 42 is used to process and store the information being streamed from a plurality of cameras 22. Video data management computer 42 are communicably attached to the plurality of display units 44 located within the cockpit 68 of aircraft 60. Plurality of display units 44 is adapted to constantly stream the capture of the plurality of cameras 22. When a pilot selects the desired view of an aircraft surface by using the video selector unit 46 it is communicably attached to a plurality of display units 44. Additionally, video selector unit 46 is adapted to allow the pilots to switch the capture of the plurality of cameras 22 on the plurality of display units 44.

In one embodiment of the present invention, video data management assembly 40 is adapted to stream the capture of a camera of the plurality cameras 22 inside the cockpit 68 to a maintenance control tower 78 in the event of an emergency. During the event of an emergency the maintenance control tower 78 may be able to assist the pilots of aircraft 60 utilizing the information being streamed to the maintenance control tower 78.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system of cameras onboard an aircraft, consisting:
 a. a camera assembly including a plurality of cameras attached at or near a bulkhead station, a right wing, a leftwing, a cockpit, and a baggage compartment of the aircraft, wherein said camera assembly further includes wires, wherein said plurality of cameras attached at said bulkhead station capture the left wing, left slats, left flaps, a left landing main landing gear, a left engine, said right wing, right slats, right flaps, a right main landing gear, a right engine and a nose landing gear of said aircraft, wherein said plurality of cameras each include a housing, wherein said housing has a triangular shape with rounded edges, said housing further including a top portion which houses a camera lens, wherein said top portion begins along a lateral edge of said housing and partially extends within a top area of said housing, said camera lens being constantly exposed from said lateral edge of said housing, said housing further including a wire extending from a side end of said housing; and
 b. a video data management assembly including a video data management computer, a plurality of display units, as well as a video selector unit.

2. The system of cameras onboard an aircraft of claim 1 wherein said plurality of cameras attached to said left wing capture the left view of an AFT fuselage, a rudder and a left stabilizer.

3. The system of cameras onboard an aircraft of claim 1 wherein said plurality of cameras attached to said right wing capture the right view of an AFT fuselage, a rudder and a right stabilizer.

4. The system of cameras onboard an aircraft of claim 1 wherein said plurality of cameras attached to said baggage compartment capture an interior view of said baggage compartment.

5. The system of cameras onboard an aircraft of claim 1 wherein said wires are used to communicably attach said plurality of cameras to said video data management assembly.

6. The system of cameras onboard an aircraft of claim 1 wherein said video data management computer streams the capture of said plurality of cameras to said plurality of display units located within said cockpit of said aircraft.

7. The system of cameras onboard an aircraft of claim 6 wherein said video data management computer stores and records the capture from said plurality of cameras.

8. The system of cameras onboard an aircraft of claim 1 wherein said video selector unit allows the pilots of said aircraft to manually select the capture displayed on said plurality of display units.

9. The system of cameras onboard an aircraft of claim 1 wherein said video data management computer streams the capture of a camera of the plurality of cameras placed within said cockpit to a maintenance control tower in the event of an emergency onboard said aircraft.

10. A system of cameras onboard an aircraft, comprising:
   a. a camera assembly including a plurality of cameras including bulkhead cameras and wing cameras, wherein said bulkhead cameras are attached at a bulkhead station of a nose cone, wherein at least one of said bulkhead cameras attached at said bulkhead station of said nose cone is located on a left side toward an outwardly tapered end at said bulkhead station of said nose cone, wherein at least one of said bulkhead cameras attached at said bulkhead station is further located on a right side toward an outwardly tapered end at said bulkhead station, wherein at least one of said bulkhead cameras attached at said bulkhead station is continually located beneath an inwardly tapered distal end at said bulkhead station, a right wing wherein at least one of said wing cameras is attached to a top of said right wing at a navigation light that is located toward the distal end of said right wing, a left wing wherein at least one of said wing cameras placed on said left wing is located toward distal end of a top of said left wing at a navigation light of said left wing, a cockpit where in the capture of said cockpit is streamed to a maintenance control tower in the event of an emergency, a baggage compartment of the aircraft, wherein said plurality of cameras each include a housing, wherein said housing has a triangular shape with rounded edges, wherein said housing further includes a top portion which houses a camera lens,
   wherein said top portion begins along a lateral edge of said housing and partially extends within a top area of said housing, said camera lens being constantly exposed from said lateral edge of said housing, said housing further including a wire extending from a side end of said housing; and
   b. a video data management assembly including a video data management computer wherein said video data management computer streams and records data captured by said plurality of cameras, a plurality of display units that are located within the interior of a cockpit of said aircraft and is configured to provide a display of the capture of said plurality of cameras to the pilots of an aircraft, as well as a video selector unit wherein said video selector unit is adapted to allow pilots of an aircraft to switch between the captures being provided by said video data management computer during flight of said aircraft.

11. A system of cameras onboard an aircraft, consisting of:
   a. a maintenance tower;
   b. an aircraft including a nose cone having a bulkhead station, a nose landing gear, a right wing having right slats and right flaps, said right wing further including a right main landing gear and a right engine, a left wing having left slats and left flaps, said left wing further including a left main landing gear and a left engine, wherein said aircraft further includes a rudder having a right stabilizer and a left stabilizer, wherein said aircraft also includes a cockpit and a baggage compartment;
   c. a plurality of cameras each having housing, wherein said housing has a triangular shape with rounded edges, said housing further including a top portion which houses a camera lens, wherein said top portion begins along a lateral edge of said housing and partially extends within a top area of said housing, said camera lens being constantly exposed from said lateral edge of said housing, said housing further including a wire extending from a side end of said housing;
   d. at least one of said cameras being located on a left side of said bulkhead station to view said left wing, left slats, said left main landing gear, and said left engine, at least one of said cameras being located on a right side of said bulkhead station to view said right wing, said right slats, said right slats, said right main landing gear, and said right engine, at least one of said cameras being located on a bottom side of said bulkhead station to view said nose landing gear, at least one of said cameras located on a tip of said left wing to view a left side of said rudder, said left stabilizer, and a left side of an AFT fuselage, at least one of said cameras located on a tip of said right wing to view a right side of said rudder, said right stabilizer, and a right side of said AFT fuselage, at least one of said cameras located within said cockpit configured to be streamed to said maintenance tower; and
   e. a video data management assembly including a video data management computer wherein said video data management computer streams and records data captured by said plurality of cameras, a plurality of display units that are located within the interior of a cockpit of said aircraft and is configured to provide a display of the capture of said plurality of cameras to the pilots of an aircraft, as well as a video selector unit wherein said video selector unit is adapted to allow pilots of an aircraft to switch between the captures being provided by said video data management computer during flight of said aircraft.

* * * * *